United States Patent
Sayama et al.

(10) Patent No.: US 9,221,233 B2
(45) Date of Patent: Dec. 29, 2015

(54) DISSIMILAR-MATERIAL WELDED STRUCTURE AND WELDING METHOD THEREFOR

(71) Applicant: HONDA MOTOR CO., LTD, Tokyo (JP)

(72) Inventors: Mitsuru Sayama, Wako (JP); Tetsuya Miyahara, Wako (JP); Shosuke Ohhama, Wako (JP); Tsutomu Kobayashi, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 14/016,381

(22) Filed: Sep. 3, 2013

(65) Prior Publication Data

US 2014/0248510 A1 Sep. 4, 2014

(30) Foreign Application Priority Data

Mar. 4, 2013 (JP) .................................. 2013-042418

(51) Int. Cl.
  B23K 20/12 (2006.01)
  B32B 15/01 (2006.01)
  B23K 20/227 (2006.01)

(52) U.S. Cl.
  CPC ............. *B32B 15/012* (2013.01); *B23K 20/122* (2013.01); *B23K 20/1265* (2013.01); *B23K 20/2275* (2013.01); *B23K 2201/006* (2013.01); *Y10T 428/12757* (2015.01)

(58) Field of Classification Search
  None
  See application file for complete search history.

(56) References Cited

U.S. PATENT DOCUMENTS

| | | | |
|---|---|---|---|
| 8,157,943 B2 * | 4/2012 | Yahaba et al. | 156/212 |
| 8,464,926 B2 * | 6/2013 | Kou et al. | 228/112.1 |
| 8,627,567 B2 * | 1/2014 | Seo et al. | 29/890.03 |
| 8,701,968 B2 * | 4/2014 | Sayama et al. | 228/112.1 |
| 2004/0079787 A1 * | 4/2004 | Okamoto et al. | 228/112.1 |
| 2005/0029331 A1 * | 2/2005 | Kano et al. | 228/112.1 |
| 2005/0189790 A1 * | 9/2005 | Chernoff et al. | 296/193.05 |

(Continued)

FOREIGN PATENT DOCUMENTS

| JP | 2001-212679 A | * | 8/2001 |
|---|---|---|---|
| JP | 2007-185690 A | * | 7/2007 |

(Continued)

OTHER PUBLICATIONS

Proving Document for Exception to Lack of Novelty filed in corresponding Japanese application No. 2013-042418, w/English translation.

*Primary Examiner* — Kiley Stoner
(74) *Attorney, Agent, or Firm* — Westerman, Hattori, Daniels & Adrian, LLP (57) ABSTRACT

Friction stir welding is performed in the following manner. In the state in which a probe is rotated in a predetermined rotation direction, the probe is inserted into a flange of a rear sub frame, thereby starting friction stir welding to weld the flange of the rear sub frame and a flange of a front sub frame positioned on the inner side of the rear side of a vehicle. The probe is sequentially moved along the direction of arrow R1→arrow R2 (predetermined direction). When the probe reaches the end point of the direction indicated by arrow R2, the probe is inserted into the flange on the outer side across a protruding portion disposed between the flanges. Then, the probe is sequentially moved in the direction of arrow R4→arrow R5→arrow R6, which is opposite to the direction of arrow R1→arrow R2.

3 Claims, 10 Drawing Sheets

(56) References Cited

U.S. PATENT DOCUMENTS

| | | | |
|---|---|---|---|
| 2005/0189791 A1* | 9/2005 | Chernoff et al. | 296/193.07 |
| 2006/0284449 A1* | 12/2006 | Miyahara | 296/204 |
| 2006/0288550 A1* | 12/2006 | Johansson | 29/53 |
| 2008/0067216 A1* | 3/2008 | Sano et al. | 228/114.5 |
| 2009/0200423 A1* | 8/2009 | Tucker | 244/123.1 |
| 2010/0098969 A1* | 4/2010 | Hashimura et al. | 428/653 |
| 2010/0310897 A1* | 12/2010 | Takaki et al. | 428/586 |
| 2011/0308059 A1* | 12/2011 | Seo et al. | 29/428 |
| 2012/0022683 A1* | 1/2012 | Fleming et al. | 700/212 |
| 2012/0049501 A1* | 3/2012 | Fujii et al. | 280/806 |
| 2013/0001964 A1* | 1/2013 | Freundl et al. | 293/133 |
| 2013/0009375 A1* | 1/2013 | Tanaka et al. | 280/124.109 |
| 2013/0011183 A1* | 1/2013 | Yahaba et al. | 403/270 |
| 2013/0249250 A1* | 9/2013 | Ohhama et al. | 296/204 |
| 2014/0004375 A1* | 1/2014 | Yamauchi | 428/615 |
| 2014/0034706 A1* | 2/2014 | Saitou | 228/2.1 |

FOREIGN PATENT DOCUMENTS

| | | | |
|---|---|---|---|
| JP | 2007-213819 A | * | 8/2007 |
| JP | 2007-289976 A | * | 11/2007 |
| JP | 2010-228755 A | * | 10/2010 |
| JP | WO 2011/125376 A1 | * | 10/2011 |
| JP | 2012-121350 A | * | 6/2012 |
| JP | 2013-049416 A | * | 3/2013 |
| JP | WO 2012/077690 A1 | * | 6/2014 |
| WO | 2011/125376 A1 | | 10/2011 |

* cited by examiner

DISSIMILAR-MATERIAL WELDED STRUCTURE AND WELDING METHOD THEREFOR

CROSS REFERENCES TO RELATED APPLICATIONS

The present application claims priority under 35 U.S.C. §119 to Japanese Patent Application No. 2013-042418, filed Mar. 4, 2013, entitled "Dissimilar-Material Welded Structure and Welding Method therefor." The contents of this application are incorporated herein by reference in their entirety.

TECHNICAL FIELD

The present disclosure relates to a dissimilar-material welded structure formed by welding dissimilar materials, for example, a carbon steel material and an aluminum material, by utilizing friction stir welding, and also to a welding method for forming such a dissimilar-material welded structure.

BACKGROUND

International Publication No. 2011/125376 and United States Patent Application Publication No. 2013/0011183 (the content of which is incorporated herein by reference in its entirety) disclose a dissimilar-material welded structure formed by welding dissimilar materials, such as a carbon steel material and an aluminum material, by utilizing friction stir welding. In this dissimilar-material welded structure, with respect to joint portions to be welded by using a welding probe, a joint portion having a smaller height of a plastic flow region is located at one side of the aluminum material and a joint portion having a larger height of a plastic flow region is located at the other side of the aluminum material.

SUMMARY

After diligent study, the inventors found the following. When welding a plurality of flanges of dissimilar materials by utilizing friction stir welding, the flanges of each of the dissimilar materials extending substantially in parallel with each other such that they oppose each other with a protruding portion therebetween, it is necessary to increase the welding strength of one side of a flange closer to the protruding portion. This is because higher stiffness and strength are required for the side of the flange closer to the protruding portion than the other side of the flange far from the protruding portion. It is also desirable to reduce the time taken to perform a friction stir welding operation when welding flanges of dissimilar materials, the flanges of each material extending substantially in parallel with each other with a protruding portion therebetween.

It is thus desirable to provide a dissimilar-material welded structure in which the welding strength of one side of a joint portion closer to a protruding portion is increased, and flanges disposed with a protruding portion therebetween of one material and those of the other material are efficiently welded, and also desirable to provide a welding method for forming such a dissimilar-material welded structure.

According to an aspect of an embodiment of the present disclosure, there is provided a friction stir welding method for a dissimilar-material welded structure comprising a steel member and an aluminum member, the steel member including a sheet-like portion, the aluminum member including a plurality of flanges extending substantially in parallel with each other, a protruding portion disposed between the flanges, and an opening, the flanges being provided on a periphery of the opening. The method includes: a step of superposing the flanges of the aluminum member on the sheet-like portion of the steel member; a step of causing a welding probe to rotate in a predetermined rotation direction and inserting the rotating welding probe into one of the flanges toward the sheet-like portion to perform the friction stir welding; a step of moving the rotating welding probe in a predetermined direction along the extending direction of the one of the flanges; and a step of moving the welding probe across the protruding portion, inserting the welding probe into the other flange located across the protruding portion without changing the predetermined rotation direction to perform the friction stir welding, and moving the rotating welding probe in a direction opposite to the predetermined direction along the extending direction of the other flange.

According to this aspect, friction stir welding is started on a plurality of flanges which are disposed substantially in parallel with each other with a protruding portion therebetween. After moving the probe in a predetermined direction on the flange on one side, the probe is moved to the flange on the other side across the protruding portion and moved in the direction opposite to the predetermined direction without changing the rotation direction of the probe. With this operation, the stiffness and the strength of the side of each of the flanges closer to the protruding portion can be increased, compared with those of the other side of each of the flanges far from the protruding portion. It is also possible to efficiently weld flanges disposed with a protruding portion therebetween of one material and those of the other material in a dissimilar-material welded structure.

In the above-described welding method may further include a step of attaching the welding probe to an arm of a robot which is movable along a three-axis rectangular coordinate system.

With the above-described method, the operation of the probe during performing friction stir welding can be facilitated. As a result, it is possible to efficiently perform friction stir welding on a plurality of flanges disposed substantially in parallel with each other with a protruding portion therebetween.

In the above-described welding method, the steel plate-like member and the aluminum member may each have a substantially angular U shape as viewed from above, and a vehicle suspension support member arranged in a double cross may be formed by welding the steel plate-like member and the aluminum member to each other by utilizing friction stir welding.

With the above-described configuration, the manufacturing of a vehicle suspension support member arranged in a double cross can be facilitated.

According to another aspect of an embodiment of the present disclosure, there is provided a dissimilar-material welded structure including: a steel member including a sheet-like portion; and an aluminum member including a plurality of flanges extending substantially in parallel with each other, a protruding portion disposed between the flanges, and an opening, the flanges being provided on a periphery of the opening. The sheet-like portion of the steel member and the flanges of the aluminum member are friction stir welded to each other by: superposing the flanges of the aluminum member on the sheet-like portion of the steel member, causing a welding probe to rotate in a predetermined rotation direction and inserting the rotating welding probe into one of the flanges toward the sheet-like portion to perform the friction stir welding; moving the rotating welding probe in a predetermined direction along the extending direction of the one of the flanges, moving the welding probe across the protruding portion, inserting the welding probe into the other flange located across the protruding portion without changing the predetermined rotation direction to perform the friction stir welding, and moving the rotating welding probe in a direction opposite to the predetermined direction along the extending direction of the other flange.

According to this aspect, it is possible to obtain a dissimilar-material welded structure in which the stiffness and the strength of the side of each of the flanges closer to the protruding portion can be increased, compared with those of the other side of each of the flanges far from the protruding portion.

BRIEF DESCRIPTION OF THE DRAWINGS

The advantages of the disclosure will become apparent in the following description taken in conjunction with the following drawings.

DETAILED DESCRIPTION

Figure 1:
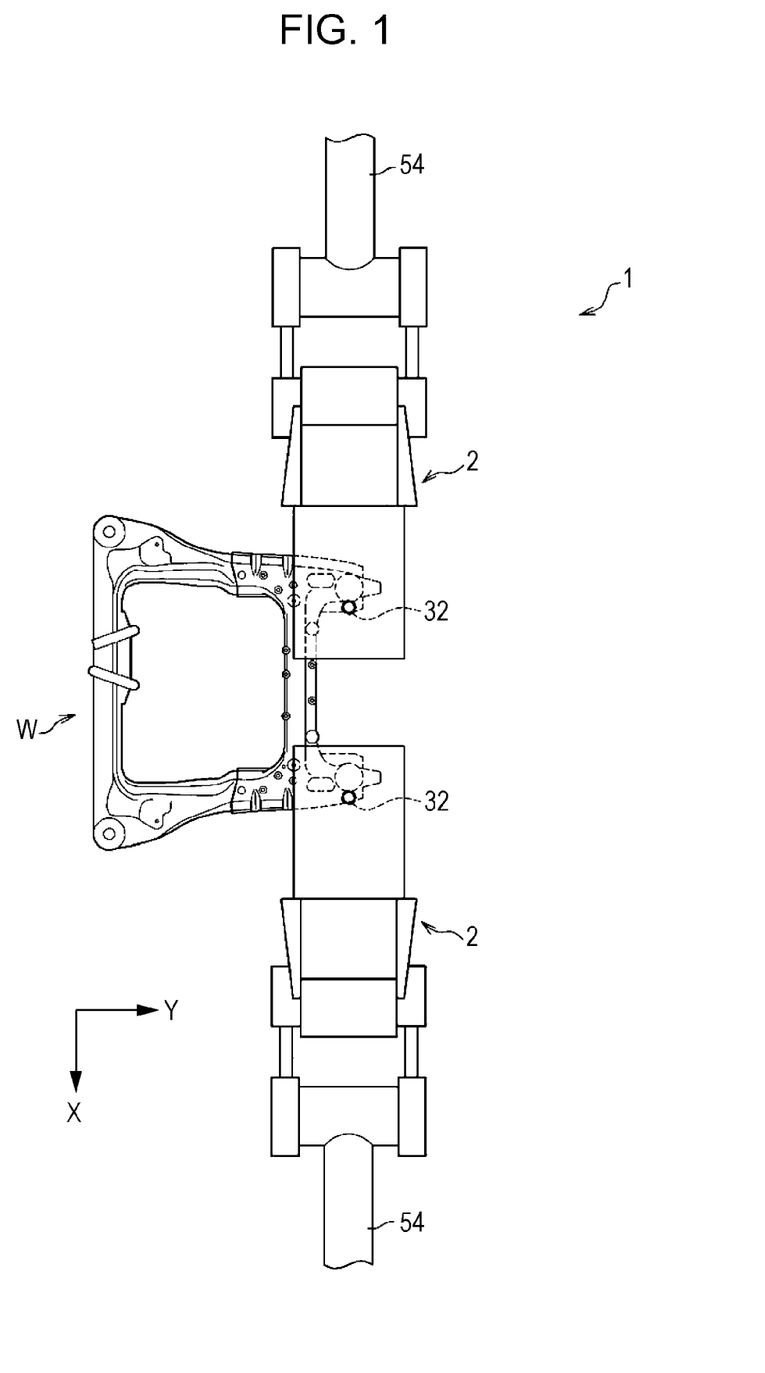
FIG. 1 is a plan view of a friction stir welding system including friction stir welding apparatuses for performing a friction stir welding method according to an embodiment of the present disclosure.
Figure 2:
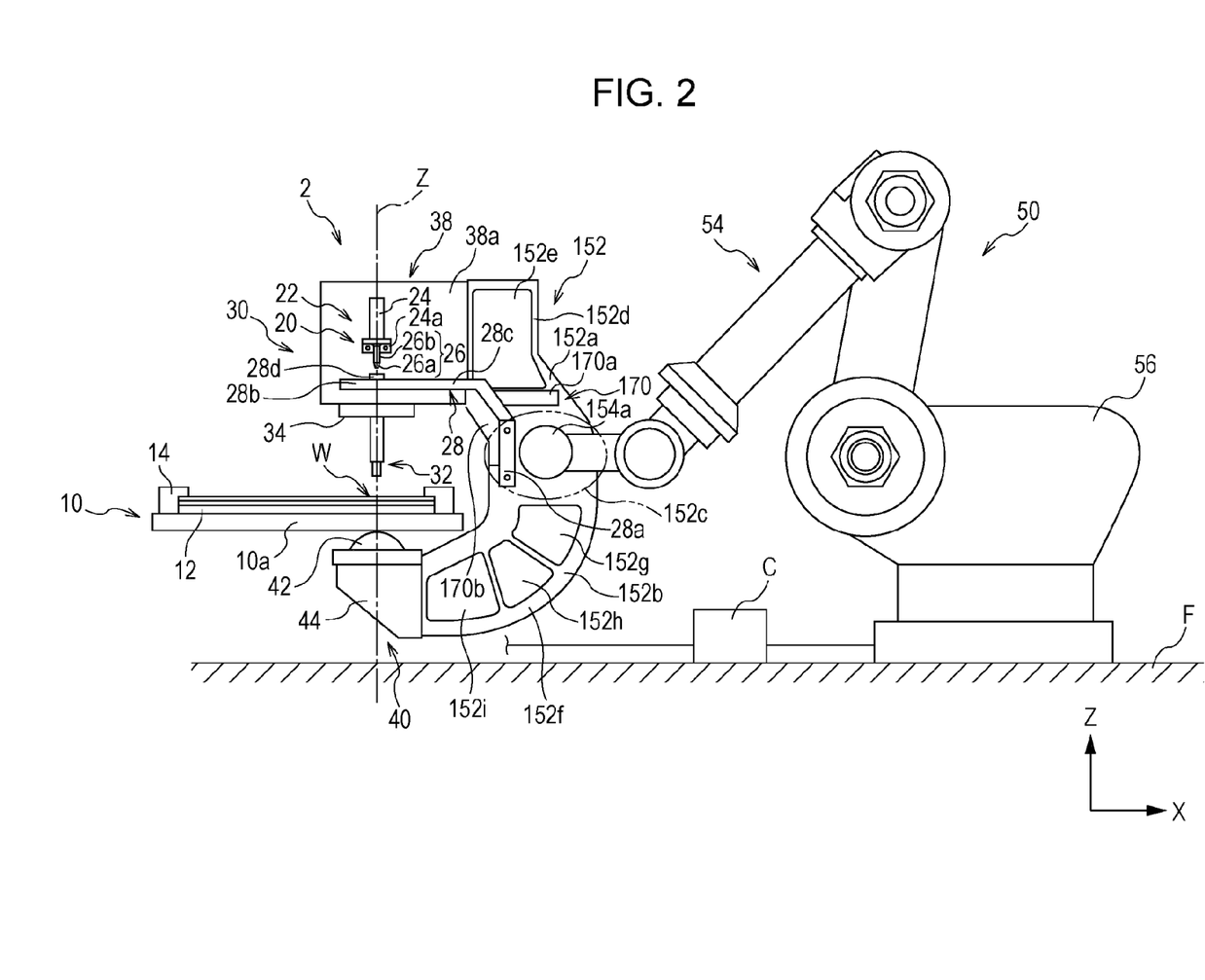
FIG. 2 is a side view of the friction stir welding apparatus shown in FIG. 1.
Figure 3A:
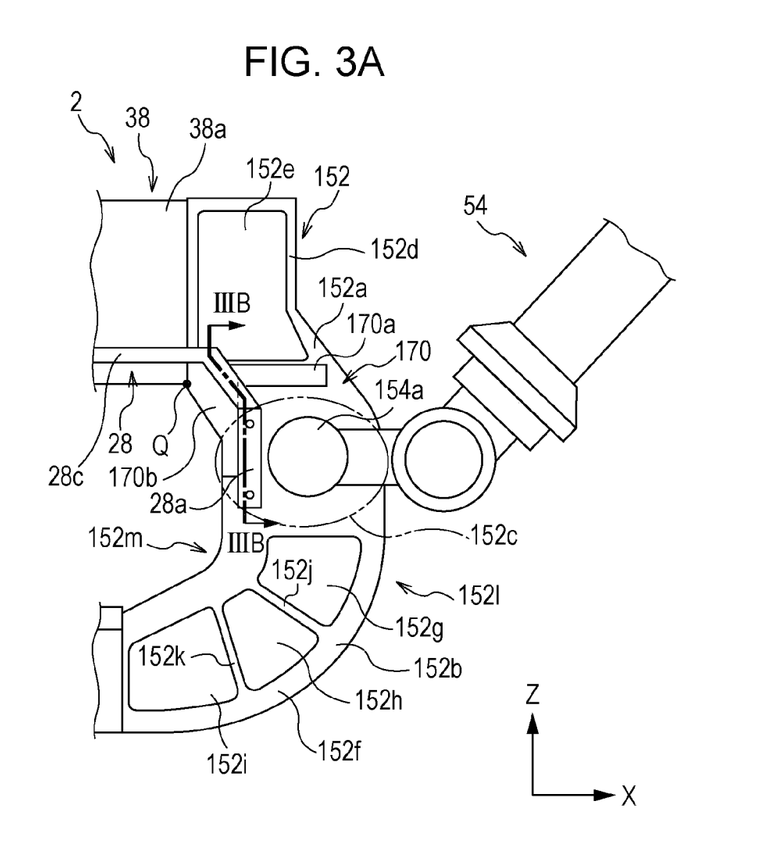
FIG. 3A is a partially enlarged side view of the friction stir welding apparatus shown in FIG. 2
Figure 3B:
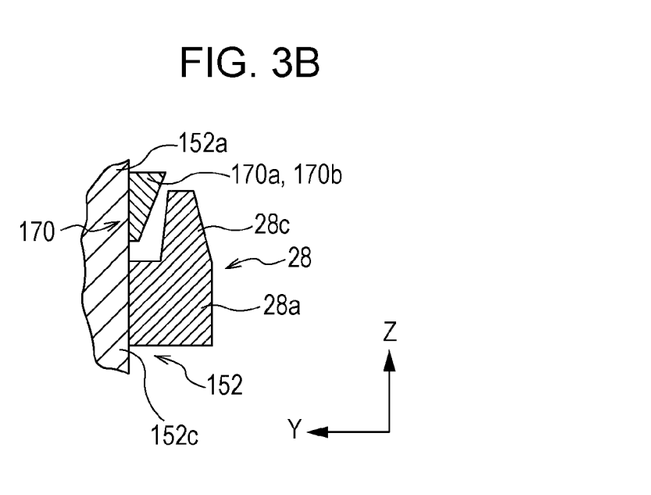
FIG. 3B is a sectional view taken along line IIIB-IIIB of FIG. 3A.
Figure 4A:
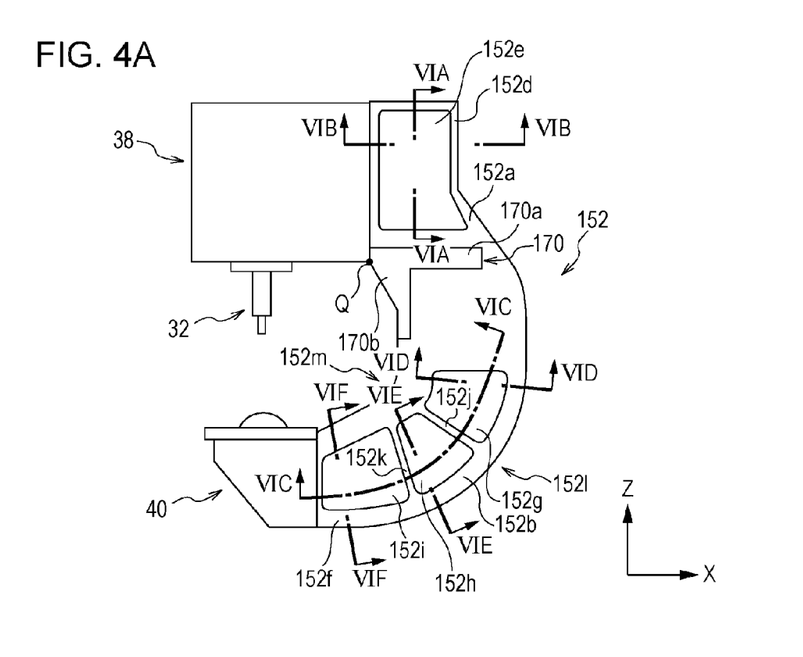
FIG. 4A is an enlarged view of a mounting jig, a drive mechanism, and an auxiliary support mechanism forming the friction stir welding apparatus shown in FIG. 2.
Figure 4B:
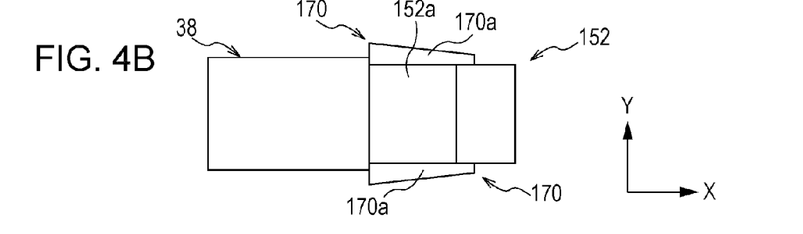
FIG. 4B is a plan view of the friction stir welding apparatus shown in FIG. 4A, as viewed in the direction of the negative side of the Z axis.
Figure 4C:
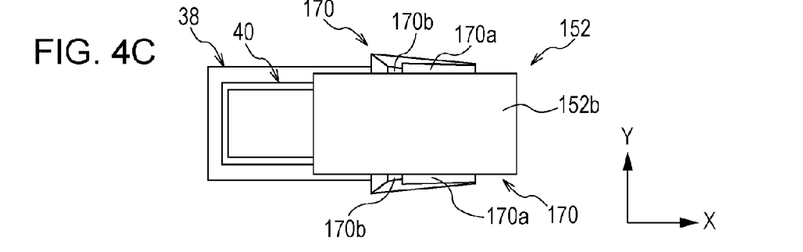
FIG. 4C is a bottom view of the friction stir welding apparatus shown in FIG. 4A, as viewed in the direction of the positive side of the Z axis.
Figure 5A:
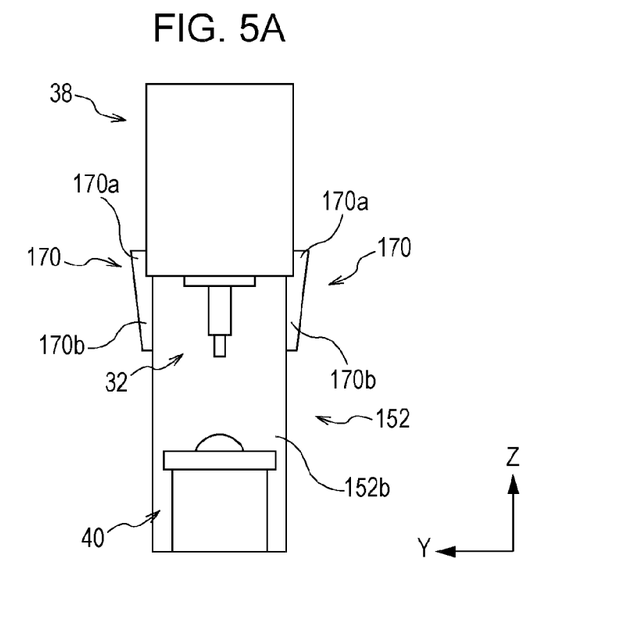
FIG. 5A is a front view of the friction stir welding apparatus shown in FIG. 4A, as viewed in the direction of the positive side of the X axis.
Figure 5B:
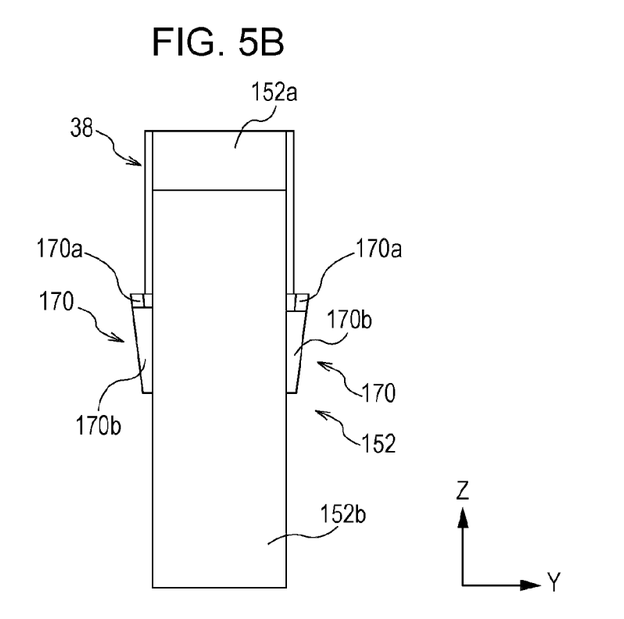
FIG. 5B is a rear view of the friction stir welding apparatus shown in FIG. 4A, as viewed in the direction of the negative side of the X axis.
Figure 6A:
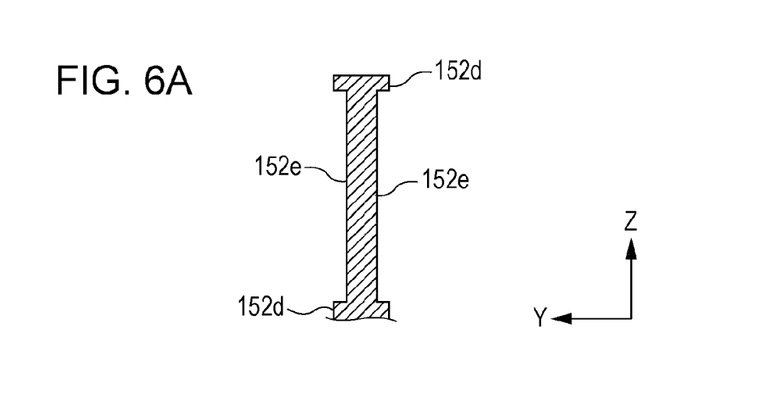
FIG. 6A is a sectional view taken along line VIA-VIA of FIG. 4A.
Figure 6B:
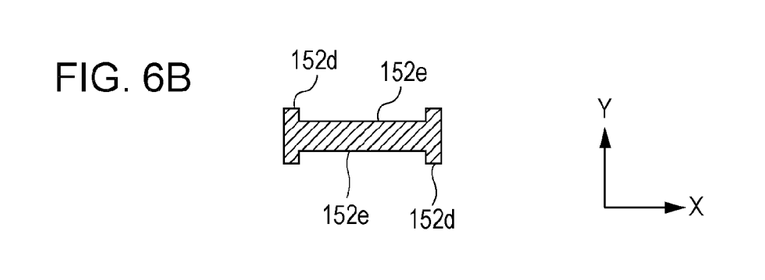
FIG. 6B is a sectional view taken along line VIB-VIB of FIG. 4A.
Figure 6C:
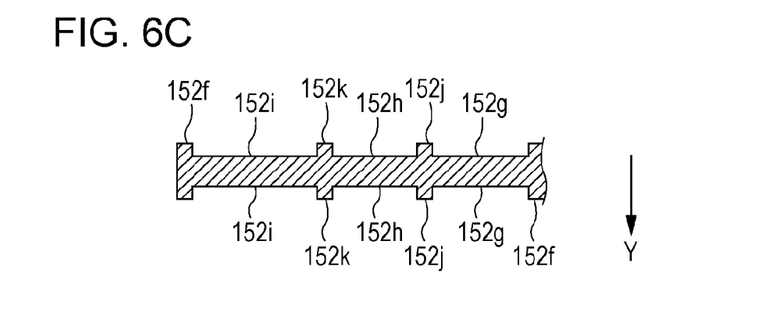
FIG. 6C is a sectional view taken along line VIC-VIC of FIG. 4A.
Figure 6D:
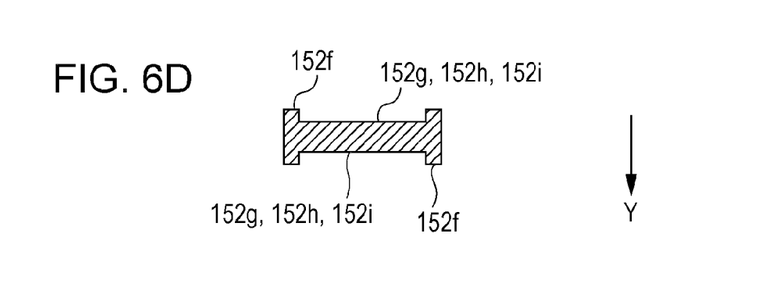
FIG. 6D is a sectional view taken along line VID-VID of FIG. 4A.

An embodiment of the present disclosure will be described below in detail with reference to the accompanying drawings. FIG. 1 is a plan view of a friction stir welding system 1 including friction stir welding apparatuses 2 for performing a friction stir welding method according to an embodiment of the present disclosure. FIG. 2 is a side view of the friction stir welding apparatus 2 shown in FIG. 1. FIG. 3A is a side view of a partially enlarged portion of the friction stir welding apparatus 2 shown in FIG. 2. FIG. 3B is a sectional view taken along line IIIB-IIIB of FIG. 3A. FIG. 4A is an enlarged view of a mounting jig, a drive mechanism, and an auxiliary support mechanism forming the friction stir welding apparatus 2 shown in FIG. 2. FIG. 4B is a plan view of the friction stir welding apparatus 2 shown in FIG. 4A, as viewed in the direction of the negative side of the Z axis. FIG. 4C is a bottom view of the friction stir welding apparatus 2 shown in FIG. 4A, as viewed in the direction of the positive side of the Z axis. FIG. 5A is a front view of the friction stir welding apparatus 2 shown in FIG. 4A, as viewed in the direction of the positive side of the X axis. FIG. 5B is a rear view of the friction stir welding apparatus 2 shown in FIG. 4A, as viewed in the direction of the negative side of the X axis. FIG. 6A is a sectional view taken along line VIA-VIA of FIG. 4A. FIG. 6B is a sectional view taken along line VIB-VIB of FIG. 4A. FIG. 6C is a sectional view taken along line VIC-VIC of FIG. 4A. FIG. 6D is a sectional view taken along line VID-VID of FIG. 4A. In FIGS. 2 through 6D, the X, Y, and Z axes form a three-axis rectangular coordinate system. The plane formed by the X and Y axes is a plane parallel to a horizontal plane, and the positive direction of the Z axis is the upward direction.

As shown in FIG. 1, the friction stir welding system 1 includes a pair of friction stir welding apparatuses 2 which are disposed such that they oppose each other with respect to a work W which will be subjected to friction stir welding. The two friction stir welding apparatuses 2 have the same configuration, and thus, one friction stir welding apparatus 2 will be described in detail while omitting an explanation of the other friction stir welding apparatus 2.

As shown in FIG. 2, the friction stir welding apparatus 2 performs friction stir welding on a subject formed by superposing dissimilar materials (hereinafter referred to as a "work W"). The friction stir welding apparatus 2 includes a stand 10, a displacement detector 20, a welding tool 30, an auxiliary support mechanism 40, and a robot 50. The stand 10 is fixed to a floor F to place the work W on the stand 10. The displacement detector 20 is freely movable above the stand 10 in the state in which it opposes the stand 10. The welding tool 30 has the displacement detector 20 fixed thereon and is freely movable above the stand 10 in the state in which it opposes the stand 10. The auxiliary support mechanism 40 is freely movable below the stand 10 in the state in which it abuts against the bottom surface of the stand 10. The robot 50 is fixed to the floor F while holding the welding tool 30 and the auxiliary support mechanism 40 by the use of a mounting jig 152. When the mounting jig 152 is deformed while performing friction stir welding, the welding tool 30 fixed to the mounting jig 152 is displaced. In FIG. 2, the stand 10 is shown in a simplified form by omitting part of the stand 10.

The stand 10 includes a placement jig 12 and a stopper 14. The placement jig 12 is used for placing the work W on a table 10a of the stand 10. The stopper 14 is provided on the placement jig 12 and fixes the work W such that the work W is removable. The position of the work W on the placement jig 12 is maintained with high precision by holding part of the work W with the stopper 14. As a drive source for driving the stopper 14, a motor or an air cylinder (neither of which is shown) may be used. Alternatively, the stopper 14 may be driven manually. Details of the work W will be given later.

The displacement detector 20 is typically a contact-type displacement detector, and includes a pair of displacement sensors 22 and a pair of typically metallic reference members 28 which supply a reference position to each of the displacement sensors 22 when the displacement sensors 22 detects a displacement. The displacement sensors 22 each includes a sensor body 24 and a movable portion 26. The movable portion 26 includes a contact 26a which communicates with the sensor body 24 and a bellows 26b which receives the contact 26a therein and covers the contact 26a, except for the end portion thereof. The contact 26a is fixed to the sensor body 24 such that an urging force urging the sensor body 24 downward is applied to the contact 26a by using an urging member, such as a coil spring (not shown). Each of the displacement sensors 22 can freely detect a displacement of a probe 32 of the welding tool 30 which is caused by a deformation of the mounting jig 152, in accordance with a distance by which the contact 26a moves in the state in which the bottom end of the contact 26a abuts against the associated reference member 28. More specifically, each of the displacement sensors 22 detects a displacement of the probe 32 in accordance with a distance by which the contact 26a moves upward while being pressed into the sensor body 24 by the reference member 28 by resisting an urging force or in accordance with a distance by which the contact 26a moves downward while being pushed back from the sensor body 24 by an urging force though it attempts to separate from the reference member 28.

The welding tool 30 includes the above-described probe (welding probe) 32, a holder 34, and a drive mechanism 38. The probe 32 is typically a vertically extending cylindrical member made of a metal, such as steel. The probe 32 is freely rotatable about the central axis Z, which is parallel with the Z axis, and is also vertically movable. The holder 34 holds the probe 32. The drive mechanism 38 vertically moves the probe 32 held in the holder 34 and also rotates the probe 32 about the central axis Z. The drive mechanism 38 contains a motor, a shaft, etc. within a housing 38a. The direction of the central axis Z of the probe 32 is a direction in which the rotating probe 32 presses the work W when performing friction stir welding.

The welding tool 30 including the probe 32 is attached to the tip end of an arm 54 of the robot 50 which is movable in accordance with the three-axis rectangular coordinate system, thereby facilitating the operation of the probe 32 when performing friction stir welding. As a result, it is possible to efficiently perform friction stir welding on a pair of flanges 240 (see FIG. 8) disposed substantially in parallel with each other with a protruding portion 242 (see FIG. 8) of the work W therebetween.

The housing 38a also serves as a frame member fixed to the mounting jig 152 while supporting the various components, and has, for example, a hollow rectangular parallelepiped shape. The displacement sensors 22 are fixed at the sensor bodies 24 through the use of fixing members 24a to a vertical wall of the housing 38a on the positive side and a vertical wall of the housing 38a of the negative side of the Y axis. The two vertical walls are positioned symmetrically with respect to the central axis Z of the probe 32. Accordingly, the displacement sensors 22 or their contacts 26a are also positioned symmetrically with respect to the central axis Z of the probe 32, and also, the contacts 26a are freely movable vertically along a movement axis which coincides with the central axis Z of the probe 32, as viewed along the direction of the Y axis. Accordingly, the displacement detector 20 can highly precisely detect a displacement of the probe 32 which is caused by a deformation of the mounting jig 152.

In the welding tool 30, when the drive mechanism 38 drives the holder 34 holding the probe 32 downward, the bottom portion of the probe 32 is pressed into the work W and passes through an aluminum material of the upper layer of the work W to reach a steel plate-like member of the lower layer of the work W.

The auxiliary support mechanism 40 includes an auxiliary support member 42 and a holder 44. The auxiliary support member 42 is typically a ball member made of a metal, such as steel, and abuts against the bottom surface of the table 10a on the side opposite to the side of the placement jig 12. The holder 44 rotatably holds the auxiliary support member 42 while making the center position of the auxiliary support member 42 unmovable. In the auxiliary support mechanism 40, in the state in which the auxiliary support member 42 opposes the bottom portion of the probe 32 with the work W therebetween, the auxiliary support member 42 supports the stand 10 in an auxiliary manner while abutting against the bottom surface of the table 10a of the stand 10 at one point of the upper portion of the auxiliary support member 42.

The robot 50 is a movement mechanism which can relatively move the welding tool 30 and the work W, which is a subject to be welded, fixed on the placement jig 12 of the stand 10. The robot 50 is typically an industrial robot. More specifically, the robot 50 includes the above-described mounting jig 152, the above-described arm 54, and a robot body 56. The mounting jig 152 is typically a product which has been cut from a steel material and has a forked shape, as viewed from the lateral side. The mounting jig 152 has an upper mounting portion 152a and a lower mounting portion 152b fixed to the welding tool 30 and the auxiliary support mechanism 40, respectively. The arm 54 is typically an articulated manipulator having the mounting jig 152 fixed thereto. The robot body 56 contains a drive mechanism for moving the arm 54, an arithmetic unit, a memory, etc. (none of which are shown).

The housing 38a of the drive mechanism 38 of the welding tool 30 is attached to the upper mounting portion 152a of the mounting jig 152, while the holder 44 of the auxiliary support mechanism 40 is attached to the lower mounting portion 152b of the mounting jig 152. A fixed portion 152c, which serves as a coupling portion for coupling the upper mounting portion 152a and the lower mounting portion 152b of the mounting jig 152, is fixed to a support portion 154a, which is one end of the arm 54, through the use of a fastening unit. The robot body 56 communicates with the other end of the arm 54. The drive mechanism of the robot body 56 is started so as to move the arm 54, and in accordance with the movement of the arm 54, the welding tool 30 and the auxiliary support mechanism 40 can be freely moved with a multiple degree of freedom, for example, in the top, bottom, right, and left directions, while maintaining a relative positional relationship between the welding tool 30 and the auxiliary support mechanism 40.

In the friction stir welding operation, the drive mechanism of the robot body 56 moves the arm 54 so as to cause the probe 32 of the welding tool 30 fixed to the upper mounting portion 152a of the mounting tool 152 to press the work W. In this case, the stiffness of the mounting jig 152, in particular, the stiffness of the upper mounting portion 152a for connecting the welding tool 30 and the arm 54 is set to be lower than the stiffness of the arm 54. Accordingly, during the friction stir welding operation, only the upper mounting portion 152a is deformed. In other words, by providing a specific deforming portion, that is, the upper mounting portion 152a, it is substantially sufficient for detection of a displacement of the probe 32 to consider only a deformation of the upper mounting portion 152a during the friction stir welding operation.

A first end 28a of the reference member 28 is fastened to each of the vertical walls (planes parallel with the X-Z plane)

of the fixed portion 152c of the mounting jig 152 on the positive side and the negative side of the Y axis. In the friction stir welding operation performed by the friction stir welding apparatus 2, the stiffness of the portion fixed by the fixed portion 152c of the mounting jig 152 is set to be equal to that of the arm 54. Each of the reference members 28 also includes a second end 28b and an extending portion 28c which extends between the first and second ends 28a and 28b to connect them. The reference members 28 are arranged for both of the housing 38a and the mounting jig 152 in association with the positive side and the negative side of the Y axis. More specifically, in the reference member 28 provided on the positive side of the Y axis, the bottom end of the contact 26a of the displacement sensor 22 provided on the positive side of the Y axis freely abuts against the top surface of a receiving member 28d fixed on the second end 28b, and the extending portion 28c extends while being separated from the vertical wall of the mounting jig 152 on the positive side of the Y axis without being constrained. Similarly, in the reference member 28 provided on the negative side of the Y axis, the bottom end of the contact 26a of the displacement sensor 22 provided on the negative side of the Y axis freely abuts against the top surface of a receiving member 28d fixed on the second end 28b, and the extending portion 28c extends while being separated from the vertical wall of the mounting jig 152 on the negative side of the Y axis without being constrained. That is, the displacement sensor 22 and the reference member 28 provided on the positive side of the Y axis form a pair, and the displacement sensor 22 and the reference member 28 provided on the negative side of the Y axis form another pair, and thus, the displacement detector 20 can detect displacements of the probe 32 at two portions by using the two pairs. If the extending portions 28c of the reference members 28 are interconnected with typically a metallic connecting member (not shown) having sufficient stiffness and strength levels, the connection strength of the reference members 28 is increased, thereby enhancing the strength and the stiffness of the entire reference members 28.

The various components forming the friction stir welding apparatus 2 are appropriately controlled in response to control signals sent from a controller C so that they can be operated to perform friction stir welding on the work W. More specifically, the controller C performs control so that the welding tool 30 can move down to cause the probe 32 to be pressed into the work W and also to rotate to stir the work W while generating frictional heat in the work W. The controller C also performs control so that the probe 32 and the work W can relatively move by using the arm 54 of the robot 50 while detecting a distance by which the contact 26a of each of the displacement sensors 22 moves while abutting against the associated reference member 28, thereby performing friction stir welding on the work W along a predetermined joint line. Each of the contacts 26a is vertically movable along the movement axis which coincides with the central axis Z of the probe 32, as viewed along the direction of the Y axis. Accordingly, during the friction stir welding operation, the contact 26a vertically moves while abutting against the associated reference member 28, and thus, a vertical displacement of the probe 32 caused by a deformation of the mounting jig 152, in particular, a deformation of the upper mounting portion 152a, can be detected with high precision. At the same time, the two pairs of the contacts 26a and the associated receiving members 28d are disposed symmetrically with respect to the central axis Z of the probe 32. Thus, vertical displacements of the probe 32 can be detected at two positions close to the probe 32 at which the pairs of the contacts 26a and the receiving members 28d are disposed, and as a result, the detected vertical displacements can be easily calculated. The controller C contains an arithmetic unit, a memory, etc. (none of which are shown), and a control program for performing friction stir welding, data concerning predetermined working directions, etc. are stored in the memory.

On vertical walls 152d of the upper mounting portion 152a on the positive side and the negative side of the Y axis, upper recessed portions 152e formed by cutting the vertical walls 152d while leaving the peripheral portions thereof as wall portions are provided. With this configuration, the upper mounting portion 152a is reduced in weight without sacrificing the strength and the stiffness thereof.

Similarly, on vertical walls 152f of the lower mounting portion 152b on the positive side and the negative side of the Y axis, first lower recessed portions 152g, second lower recessed portions 152h, and third lower recessed portions 152i formed by cutting the vertical walls 152b while leaving the peripheral portions thereof as wall portions are sequentially provided from the top to the bottom side. With this configuration, the lower mounting portion 152b is reduced in weight without sacrificing the strength and the stiffness thereof.

In order to maintain the strength and the stiffness of the lower mounting portion 152b, a first rib 152j (see FIG. 3A) which is flush with the vertical wall 152f on the positive side of the Y axis is provided between the first lower recessed portion 152g and the second lower recessed portion 152h of the lower mounting portion 152b on the positive side of the Y axis, and also, a first rib 152j which is flush with the vertical wall 152f on the negative side of the Y axis is provided between the first lower recessed portion 152g and the second lower recessed portion 152h of the lower mounting portion 152b on the negative side of the Y axis. Similarly, a second rib 152k (see FIG. 3A) which is flush with the vertical wall 152f on the positive side of the Y axis is provided between the second lower recessed portion 152h and the third lower recessed portion 152i of the lower mounting portion 152b on the positive side of the Y axis, and also, a second rib 152k which is flush with the vertical wall 152f on the negative side of the Y axis is provided between the second lower recessed portion 152h and the third lower recessed portion 152i of the lower mounting portion 152b on the negative side of the Y axis.

The peripheral edge of the lower mounting portion 152b on the positive side of the X axis has a single arc shape, and the peripheral edge of the lower mounting portion 152b on the negative side of the X axis has a smooth shape by connecting two intersecting straight lines with an arc so that an unnecessary corner may not be generated. With this configuration, the generation of unnecessary stress concentration on the lower mounting portion 152b is suppressed. In this case, in order to maintain the balance of the strength of the lower mounting portion 152b, the first rib 152j and the second rib 152k extend in the radial direction of the single arc formed on the peripheral edge of the lower mounting portion 152b on the positive side of the X axis. The peripheral edge of the lower mounting portion 152b on the negative side of the X axis has a single arc shape, thereby suppressing the generation of unnecessary stress concentration on the lower mounting portion 152b.

A reinforcing member 170 is provided from the upper mounting portion 152a to the fixed portion 152c. The reinforcing member 170 is fixed between the welding tool 30 and the fixed portion 152c such that it projects from the vertical wall (plane parallel with the X-Z plane) of the mounting jig 152 on the negative side of the Y axis toward the negative side of the Y axis. The reinforcing member 170 includes a body 170a and an extending portion 170b extending downward from the body 170a.

More specifically, the body 170a of the reinforcing member 170 has a vertical length to vertically stretch down over a front bottom end Q (extending perpendicular to the X-Z plane) of the upper mounting portion 152a, which is a high stress portion, in the vertical wall 152d of the upper mounting portion 152a on the negative side of the Y axis, while projecting from the vertical wall 152d of the upper mounting portion 152a on the negative side of the Y axis toward the negative side of the Y axis. The body 170a of the reinforcing member 170 also extends from the peripheral edge of the upper mounting portion 152a on the negative side of the X axis to the positive side of the X axis, thereby relaxing the stress of the upper mounting portion 152a.

The extending portion 170b of the reinforcing member 170 extends downward from the body 170a such that it enters the fixed portion 152c, which is a high stiffness portion, while projecting from the vertical wall 152d of the upper mounting portion 152a on the negative side of the Y axis toward the negative side of the Y axis, thereby relaxing the stress of the upper mounting portion 152a.

Figure 7:
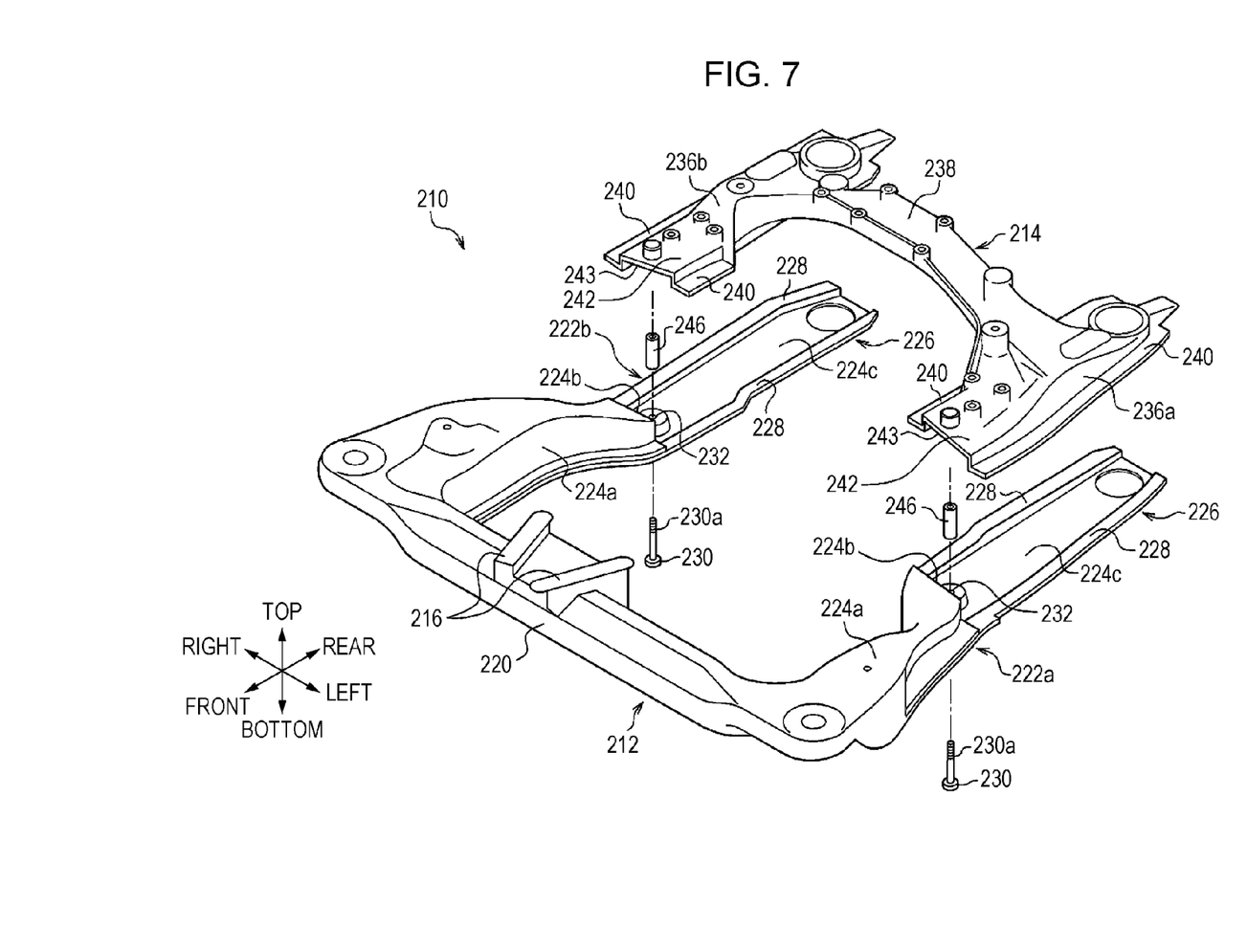
FIG. 7 is an exploded perspective view of a sub-frame structure manufactured by friction stir welding.
Figure 8:
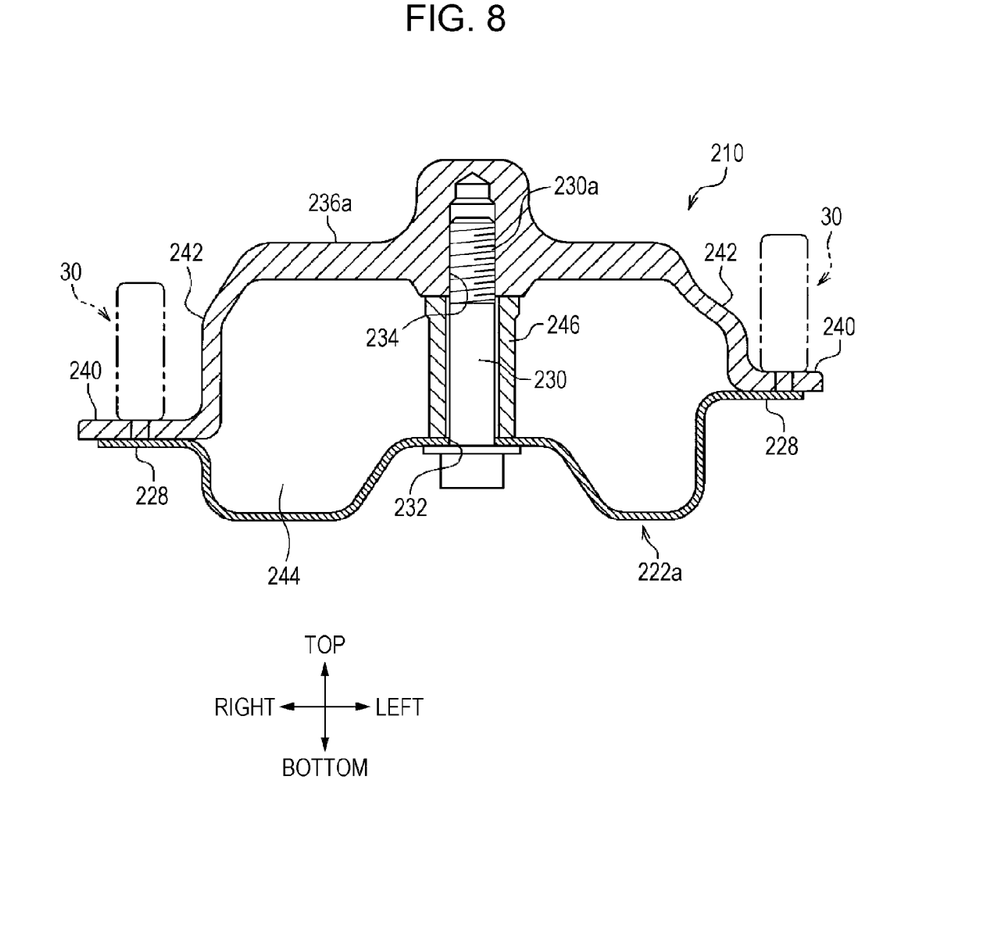
FIG. 8 is a vertical sectional view of a superposed portion of a front sub frame and a rear sub frame in the sub-frame structure.

The work W will be described below with reference to FIGS. 7 and 8. FIG. 7 is an exploded perspective view of a sub-frame structure manufactured by friction stir welding. FIG. 8 is a vertical sectional view of a superposed portion of a front sub frame and a rear sub frame in the sub-frame structure. The work W is constituted by a front sub frame (steel plate-like member) 212 and a rear sub frame (aluminum member) 214 (see FIG. 7), and is formed by superposing the steel plate-like member and the aluminum member. By performing friction stir welding on the work W, a sub-frame structure (dissimilar-material welded structure) 210, which is a vehicle suspension support member arranged in a double cross, is manufactured.

The sub-frame structure 210 is provided such that it is fixed to a vehicle member (skeleton member) (not shown) disposed on the front side of a vehicle, or such that it is floatably supported by a floating mechanism (not shown). If the sub-frame structure 210 is supported by a floating mechanism (not shown), vibration transmitted from a vehicle body can be appropriately absorbed.

As shown in FIG. 7, the sub-frame structure 210 is divided into front and rear portions with respect to the longitudinal direction of the vehicle, and is constituted by the steel front sub frame 212 (steel plate-like member) and the aluminum rear sub frame 214 (aluminum member). The front sub frame 212 and the rear sub frame 214 are formed in a substantially angular U shape as viewed from above. The front sub frame 212 is a press-molded body formed by pressing-molding a steel plate-like member (not shown), and the rear sub frame 214 is a die-cast body formed by solidifying a molten aluminum alloy (aluminum) within a cavity of a die (die-cast machine) (not shown) by means of die-cast molding.

Figure 9:
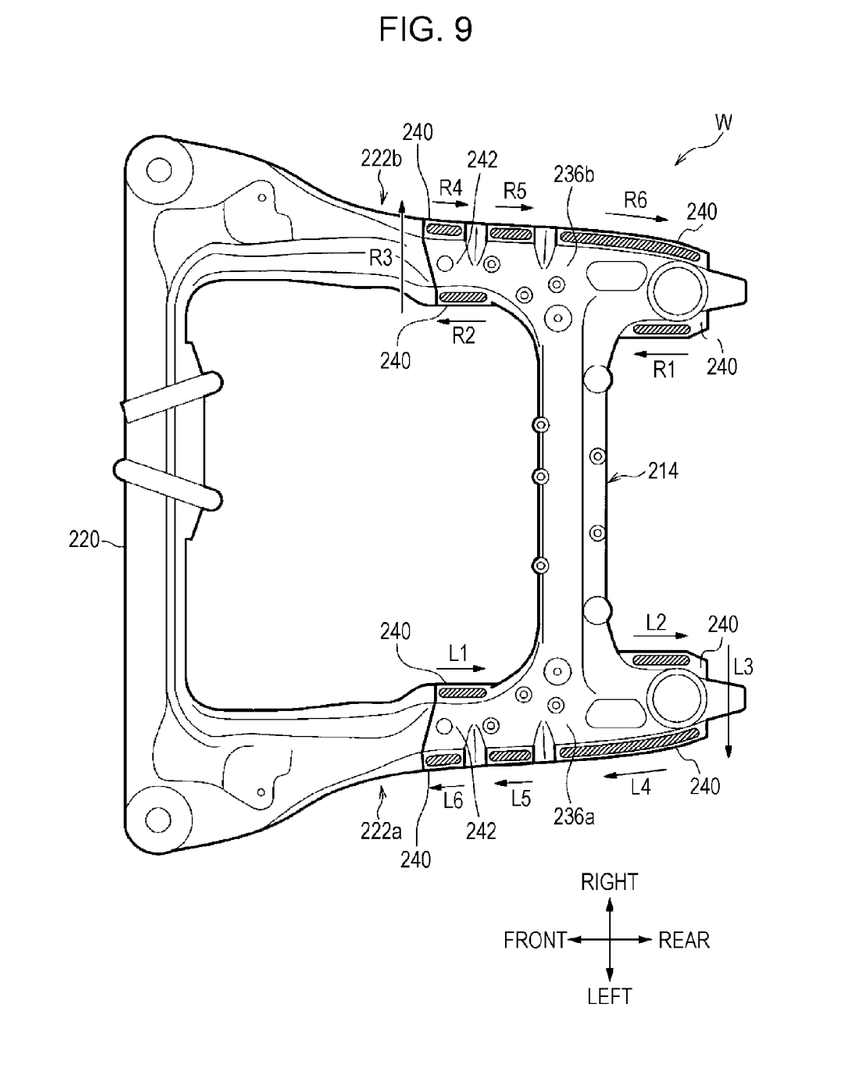
FIG. 9 is a plan view showing welding directions and welding orders of a probe when performing friction stir welding.

In FIGS. 7 through 9, "front" and "rear" respectively indicate front and rear sides of a vehicle in the longitudinal direction of the vehicle, and "right" and "left" respectively indicate the right side and the left side of the vehicle in the widthwise direction of the vehicle.

As shown in FIG. 7, the front sub frame 212 includes a front cross member 220 and a pair of left and right side members 222a and 222b. The front cross member 220 supports an engine (not shown) positioned at the front of the vehicle through a front engine mount (not shown) to be mounted on a mounting portion 216, and extends in the widthwise direction of the vehicle. The pair of left and right side members 222a and 222b are coupled to both ends of the front cross member 220 in the axial direction, and extend toward the rear of the vehicle substantially in parallel with each other.

The front cross member 220 and the pair of left and right side members 222a and 222b may be integrally formed by, for example, casting or forging. Alternatively, the front ends of the pair of left and right side members 222a and 222b may be welded to both ends of the front cross member 220 in the axial direction.

The front cross member 220 is formed by using a hollow steel member. Front portions 224a positioned in front of central portions (intermediate portions) 224b in the axial direction of the pair of left and right side members 222a and 222b are formed by using a hollow steel member. The central portions 224b and rear portions 224c positioned in back of the central portions 224b are formed by using thin sheets (sheet-like portions) 226 which are formed thinner than the front portions 224a.

In this case, the thin sheets 226 of the pair of left and right side members 222a and 222b are formed such that they extend (expand) toward the rear longer than known left and right side members by a predetermined length. As shown in FIG. 8, the central portion 224b of each of the left and right side members 222a and 222b and the corresponding thin sheet 226 are formed of one thin sheet in a substantially hat-like shape in a vertical cross section, and a flange 228 extending in the axial direction is formed at each of the left and right edges of each of the left and right side members 222a and 222b (the right side member 222b is not shown in FIG. 8).

Bolt holes 232 into which a pair of bolts 230 are inserted are formed in the central portions 224b disposed along the axial direction of the pair of left and right side members 222a and 222b. In this case, as shown in FIG. 8, the pair of bolts 230 are caused to pass through the bolt holes 232 of the left and right side members 222a and 222b from the bottom side, and threaded screws 230a of the bolts 230 are fastened into closed-end screw holes 234 provided at the front end of the rear sub frame 214. As a result, the front sub frame 212 and the rear sub frame 214 are fixed to each other through the use of the pair of bolts 230 on the left and right sides in the widthwise direction of the vehicle.

The rear sub frame 214 is constituted by a rear member which supports the rear of engine through a rear engine mount (not shown) and extends in the widthwise direction of the vehicle. The rear member includes a pair of left and right rear side portions 236a and 236b and a rear cross portion 238. The pair of left and right rear side portions 236a and 236b are superposed on the top surfaces of the central portions 224b and the thin sheets 226 positioned in back of the central portions 224b so as to cover part of the top surfaces of the pair of left and right side members 222a and 222b, respectively. The rear cross portion 238 interconnects the pair of left and right rear side portions 236a and 236b. The rear member is preferably formed of a light-metal member, such as aluminum, magnesium, or an alloy thereof.

A pair of flanges 240 are provided on both sides of each of the left and right rear side portions 236a and 236b, and are formed such that they extend from one end to the other end of each of the left and right rear side portions 236a and 236b in the axial direction. In each of the left and right rear side portions 236a and 236b, a protruding portion 242 extending upward is provided between one flange 240 and the other flange 240. By providing the protruding portion 242 between the pair of flanges 240, an opening 243 is formed at the front side of each of the left and right rear side portions 236a and 236b. The pair of flanges 240 are provided at the peripheral edges of the opening 243. In each of the left and right rear side portions 236a and 236b, the pair of flanges 240 extend substantially in parallel with each other while opposing each other, and the protruding portion 242 is formed between the pair of flanges 240 extending substantially in parallel with each other.

In this case, the flanges 228 provided on the left and right sides of each of the left and right side members 222a and 222b are positioned at the lower layer, and the flanges 240 provided on the left and right sides of each of the left and right rear side portions 236a and 236b are provided at the upper layer. The flanges 228 and the flanges 240 are integrally welded to each other by means of friction stir welding in the state in which they are superposed on each other, thereby forming closed cross sections 244 (see FIG. 8).

The left and right side members 222a and 222b are fastened to the left and right rear side portions 236a and 236b, respectively, by screwing the bolts 230 which are inserted into the bolt holes 232 provided at the widthwise central portions 224b into the screw holes 234 provided in the left and right rear side portions 236a and 236b and by causing the bolts 230 to pass through the closed cross sections 244.

Within each of the closed cross sections 244, a collar member 246 is provided. The collar member 246 is formed of a cylindrical member to surround the peripheral surface of the bolt 230 and reinforces the welding strength between the left and right side members 222a and 222b and the left and right rear side portions 236a and 236b, respectively, when the bolt 230 is fastened. The portion at which the bolt 230 is fastened is a portion at which the front sub frame 212 and the rear sub frame 214 are not welded by friction stir welding, and thus, such a portion, which is unable to be welded, can be reinforced by fastening the bolt 230. As a result, when welding the steel front sub frame 212 and the aluminum rear sub frame 214 to each other by means of friction stir welding, desired stiffness and strength levels can be obtained by a cooperative relationship between a friction stir welding operation and a fastening operation for fastening non-welded portions with the bolts 230.

Accordingly, the front sub frame 212 and the rear sub frame 214 are firmly fixed (welded) to each other by welding the superposed flanges 228 and 240 by means of friction stir welding, and also by fastening non-welded portions of the front sub frame 212 and the rear sub frame 214 with the use of the bolts 230, thereby further increasing the stiffness and the strength of the entire sub-frame structure 210.

The friction stir welding apparatus 2 for performing a friction stir welding method of this embodiment is basically configured as described above. The operation and advantages of the friction stir welding apparatus 2 will be discussed below.

A description will now be given of a process for integrally welding joint portions, by means of friction stir welding, at which the flanges 228 of the steel front sub frame 212 and the flanges 240 of the aluminum rear sub frame 214 are superposed on each other.

Before starting the friction stir welding process, in the robot 50, the welding tool 30 having the probe 32 is fixed to the upper mounting portion 152a of the mounting jig 152, and the auxiliary support mechanism 40 is fixed to the lower mounting portion 152b of the mounting jig 152.

After setting the front sub frame 212 on the stand 10, a sealant (not shown) (for example, an air drying sealant) is applied to the top surface of the front sub frame 212 by using a sealant coating mechanism (not shown). After positioning and superposing the rear sub frame 214 on the top surface (the thin sheet 226 in back of the central portion 224b) of the front sub frame 212 coated with a sealant, part of the front sub frame 212 and part of the rear sub frame 214 vertically superposed on each other are clamped with the stopper 14.

Then, the flanges 228 of the front sub frame 212 and the flanges 240 of the rear sub frame 214 are subjected to friction stir welding by using the welding tool 30.

Figure 10A:
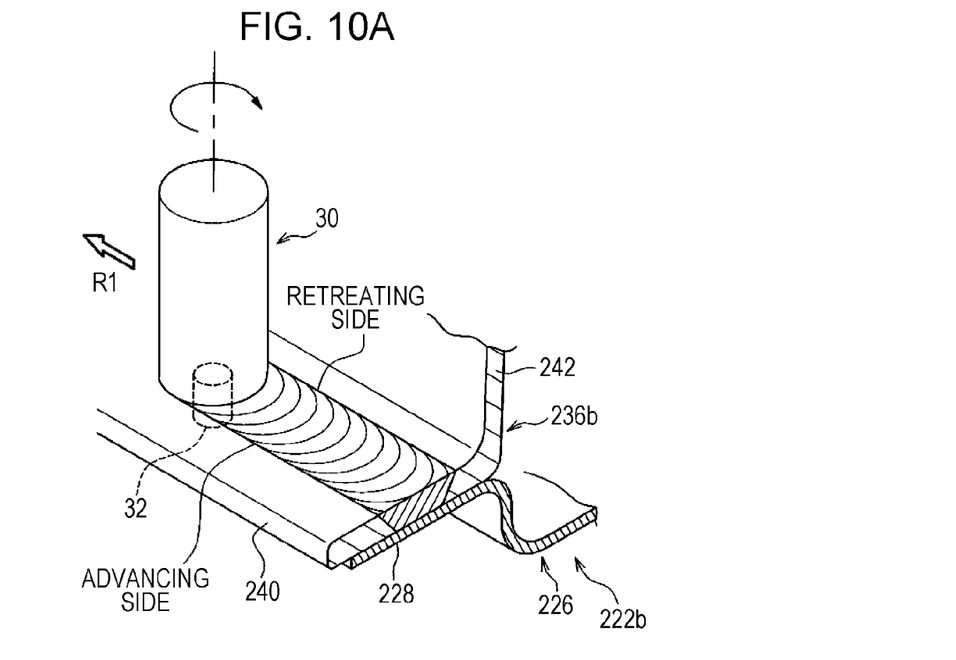
FIG. 10A is a partially broken perspective view showing a state in which flanges of a right side member and a right rear side portion are welded by using a probe along the direction indicated by arrow R1.
Figure 10B:
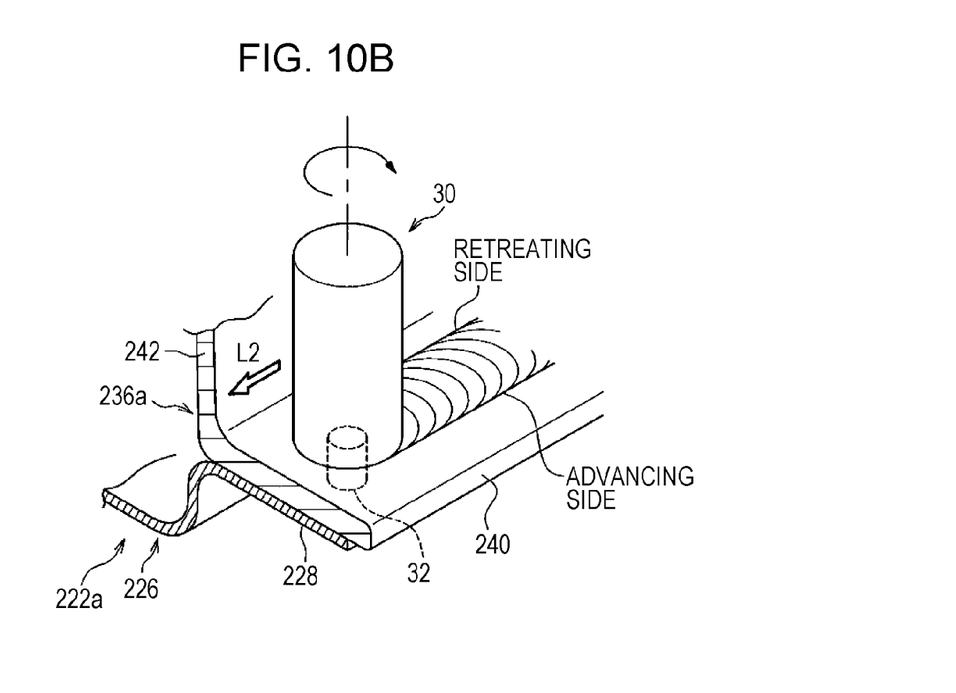
FIG. 10B is a partially broken perspective view showing a state in which flanges of a left side member and a left rear side portion are welded by using the probe along the direction indicated by arrow L2.

FIG. 9 is a plan view showing welding directions and welding orders of the probe 32 when performing friction stir welding. FIG. 10A is a partially broken perspective view showing a state in which the flanges 228 and 240 of the right side member 222b and the right rear side portion 236b, respectively, are welded by using the probe 32 along the direction indicated by arrow R1. FIG. 10B is a partially broken perspective view showing a state in which the flanges 228 and 240 of the left side member 222a and the left rear side portion 236a, respectively, are welded by using the probe 32 along the direction indicated by arrow L2. In FIG. 9, a plurality of hatched portions indicate welded portions (welded joint portions) subjected to friction stir welding by using the probe 32.

By using the friction stir welding apparatus 2 disposed on one side, the flanges 240 of the right rear side portion 236b of the rear sub frame 214 and the flanges 228 of the thin sheet 226 of the right side member 222b of the front side frame 212 are welded by means of friction stir welding.

More specifically, the friction stir welding apparatus 2 disposed on one side performs friction stir welding in the following manner. In the state in which the probe 32 is rotated clockwise (indicated by the arrow in FIG. 10A) as viewed from above by using the drive mechanism 38, the probe 32 is inserted into the flange 240 of the aluminum rear sub frame 214, thereby starting friction stir welding to weld the flanges 240 and 228 positioned on the inner side of the rear side of the vehicle. The probe 32 is sequentially moved along the direction of arrow R1→arrow R2 (predetermined direction) (see FIG. 9) by the operation of the arm 54 of the robot 50.

When the probe 32 reaches the end point of the direction indicated by arrow R2, the arm 54 of the robot 50 is displaced so that the probe 32 can cross the protruding portion 242 in the direction indicated by arrow R3 and be inserted into the flange 240 on the outer side. Then, the probe 32 is sequentially moved in the direction of arrow R4→arrow R5→arrow R6, which is opposite to the direction of arrow R1→arrow R2.

At the same time or substantially at the same time as the operation of the friction stir welding apparatus 2 positioned on one side, the friction stir welding apparatus 2 positioned on the other side performs friction stir welding. More specifically, the flanges 240 of the left rear side portion 236a of the rear sub frame 214 and the flanges 228 of the thin sheet 226 of the left side member 222a of the front side frame 212 are welded by means of friction stir welding.

More specifically, the friction stir welding apparatus 2 disposed on the other side performs friction stir welding in the following manner. In the state in which the probe 32 is rotated clockwise (indicated by the arrow in FIG. 10B) as viewed from above by using the drive mechanism 38, the probe 32 is inserted into the flange 240 of the aluminum rear sub frame 214, thereby starting friction stir welding to weld the flanges 240 and 228 positioned on the inner side of the front side of the vehicle. The probe 32 is sequentially moved along the direction of arrow L1→arrow L2 (predetermined direction) (see FIG. 9) by the operation of the arm 54 of the robot 50.

When the probe 32 reaches the end point of the direction indicated by arrow L2, the arm 54 of the robot 50 is displaced so that the probe 32 can cross the protruding portion 242 in the direction indicated by arrow L3 and be inserted into the flange 240 on the outer side. Then, the probe 32 is sequentially moved in the direction of arrow L4→arrow L5→arrow L6, which is opposite to the direction of arrow L1→arrow L2.

In this manner, in this embodiment, by causing the probe 32 of the welding tool 30 to reciprocate on the pair of flanges 240 which are disposed substantially in parallel with each other with the protruding portion 242 therebetween, friction stir welding can be efficiently performed on the pair of flanges 240 while maintaining the same rotation direction of the probe 32.

In this embodiment, since friction stir welding can be started from the right and left sides of the pair of left and right rear side portions 236a and 236b, the retreating side at which the moving direction of the probe 32 is opposite to the rotation direction of the probe 32 can be set to be the side of the flange 240 closer to the protruding portion 242 for which higher stiffness and strength are required (see FIGS. 10A and 10B). In other words, by setting the side of the flange 240 closer to the protruding portion 242 as the retreating side, the stiffness and the strength of the side of the flange 240 closer to the protruding portion 242 can be increased, compared with those of the other side of the flange 240 far from the protruding portion 242. Thus, in this embodiment, desired balanced stiffness and strength can be obtained for the sub frame structure 210. Generally, compared with the advancing side at which the moving direction of the probe 32 coincides with the rotation direction of the probe 32, the region of plastic flow generated by the probe 32 can be increased on the retreating side.

In this embodiment, by causing the probe 32 to reciprocate from a predetermined direction (the direction of arrow R1→arrow R2 or the direction of arrow L1→arrow L2) to the opposite direction (the direction of arrow R4→arrow R5→arrow R6 or the direction of arrow L4→arrow L5→arrow L6) via the protruding portion 242 without changing the rotation direction of the probe 32, both of the flanges 240 on the inner side and the flanges 240 on the outer side of the sub frame structure 210 can be set as the retreating sides, thereby facilitating friction stir welding.

In this embodiment, the plurality of welded joint portions indicated by hatched portions in FIG. 9 are disposed line-symmetrically with each other. Accordingly, even if the welding tool 30 having a so-called C shape is used, the pair of left and right rear side portions 236a and 236b can be subjected to friction stir welding simultaneously or almost simultaneously without interfering with each other. As a result, the time taken to perform friction stir welding can be decreased, thereby implementing an efficient friction stir welding operation.

In this embodiment, by using the friction stir welding apparatuses 2 disposed on one side and on the other side, friction stir welding is started from the inner side of the sub frame structure 210 (see arrow R1 and arrow L1). However, the start point of friction stir welding is not restricted to the inner side of the sub frame structure 210. Instead, friction stir welding is started from the outer side of the sub frame structure 210. For example, the moving direction of the probe 32 of the friction stir welding apparatus 2 on one side may be set to be the direction of arrow R1→arrow R2→arrow R3→arrow R4→arrow R5→arrow R6 (which is the same as that described above), and the probe 32 of the friction stir welding apparatus 2 on the other side may be sequentially moved in the direction of arrow L4→arrow L5→arrow L6, and then may cross the protruding portion 242, and be further sequentially moved in the direction of arrow L1→arrow L2.

By the application of this embodiment to joint portions of the sub frame structure 210, the manufacturing of a vehicle suspension support member arranged in a double cross can be facilitated. However, this embodiment may also be applicable to joint portions of a dissimilar material welded structure, other than a vehicle, in which a plurality of flanges extend substantially in parallel with each other with a protruding portion therebetween. The present disclosure is not limited to the above-described embodiment, and variations and modifications may be made without departing from the scope of the present disclosure.

We claim:

1. A friction stir welding method for a dissimilar-material welded structure comprising an iron member and an aluminum member, the iron member including a substantially sheet portion, the aluminum member including a plurality of flanges extending substantially in parallel with each other, a protruding portion disposed between the flanges, and an opening, the flanges being provided on a periphery of the opening, the method comprising:

a step of preparing a sub-frame structure including a first side member and a second side member extending substantially in parallel to each other and extending along a front-rear direction of a vehicle and a cross member connecting the first side member and the second side member, the first side member and the second side member each including the iron member and the aluminum member;

a step of preparing a first friction stir welding apparatus positioned on the first side member side of the sub-frame structure and a second friction stir welding apparatus positioned on the second side member side of the sub-frame structure such that the first friction stir welding apparatus and the second friction stir welding apparatus are opposite to each other, the first friction stir welding apparatus including a first welding probe and the second stir welding apparatus including a second welding probe;

a step of superposing the flanges of the aluminum member on the sheet portion of the iron member for the first side member and the second side member, respectively;

a step of positioning the first friction stir welding apparatus at an inner front end of the first side member and positioning the second stir welding apparatus at an inner rear end of the second side member;

a step of causing the first welding probe to rotate in a first predetermined rotation direction and inserting the rotating first welding probe into one of the flanges of the first side member toward the sheet portion to perform the friction stir welding, and causing the second welding probe to rotate in a second predetermined rotation direction and inserting the rotating second welding probe into one of the flanges of the second side member toward the sheet portion to perform the friction stir welding;

a step of moving the rotating first welding probe from the inner front end of the first side member in a first predetermined direction along the extending direction of the one of the flanges such that a retreating side of the first welding probe is positioned closer to the protruding portion than an advancing side of the first welding probe, wherein the advancing side is a side of the first welding probe at which the first predetermined rotation direction of the first welding probe coincides with the moving direction of the first welding probe, and the retreating side is a side of the first welding probe opposite to the advancing side at which the first predetermined rotation direction of the first welding probe is opposite to the moving direction of the first welding probe;

a step of moving the rotating second welding probe from the inner rear end of the second side member in a second predetermined direction opposite to the first predetermined direction of the first welding probe along the extending direction of the one of the flanges such that a retreating side of the second welding probe is positioned closer to the protruding portion than an advancing side of the second welding probe, wherein the advancing side is a side of the second welding probe at which the second predetermined rotation direction of the second welding probe coincides with the moving direction of the second welding probe, and the retreating side is a side of the second welding probe opposite to the advancing side at which the second predetermined rotation direction of the second welding probe is opposite to the moving direction of the second welding probe, wherein the rotating first welding probe and the rotating second welding probe are moved simultaneously in the first predetermined direction and the second predetermined direction, respectively;

a step of moving the first welding probe across the protruding portion, inserting the first welding probe into the other flange located across the protruding portion without changing the first predetermined rotation direction to perform the first friction stir welding, and moving the rotating first welding probe in a direction opposite to the first predetermined direction along the extending direction of the other flange such that the retreating side of the first welding probe is positioned closer to the protruding portion than the advancing side of the first welding probe; and a step of moving the second welding probe across the protruding portion, inserting the second welding probe into the other flange located across the protruding portion without changing the second predetermined rotation direction to perform the friction stir welding, and moving the rotating second welding probe in a direction opposite to the second predetermined direction along the extending direction of the other flange such that the retreating side of the second welding probe is positioned closer to the protruding portion than the advancing side of the second welding probe.

2. The welding method according to claim 1, further comprising:

before the step of causing one of the first welding probe and the second welding probe to rotate, a step of attaching the one welding probe to an arm of a robot which is movable along a three-axis rectangular coordinate system.

3. The welding method according to claim 1, wherein:

the iron member and the aluminum member each have a substantially angular U shape as viewed from above; and a vehicle suspension support member in a shape of double cross is formed by friction stir welding the iron member and the aluminum member to each other.

* * * * *